US012790137B2

(12) United States Patent
Wessendorf

(10) Patent No.: US 12,790,137 B2
(45) Date of Patent: Nov. 10, 2026

(54) PNEUMATIC TRANSPORT OF INSECTS

(71) Applicant: Illucens GmbH, Ahaus (DE)

(72) Inventor: Dirk Wessendorf, Ahaus (DE)

(73) Assignee: ILLUCENS GMBH, Ahaus (DE)

( * ) Notice: Subject to any disclaimer, the term of this patent is extended or adjusted under 35 U.S.C. 154(b) by 232 days.

(21) Appl. No.: 18/277,241

(22) PCT Filed: Feb. 23, 2022

(86) PCT No.: PCT/EP2022/054578
§ 371 (c)(1),
(2) Date: Aug. 15, 2023

(87) PCT Pub. No.: WO2022/180129
PCT Pub. Date: Sep. 1, 2022

(65) Prior Publication Data

US 2024/0124249 A1 Apr. 18, 2024

(30) Foreign Application Priority Data

Feb. 24, 2021 (EP) .................................... 21159057

(51) Int. Cl.
*B65G 53/08* (2006.01)
*B65G 53/36* (2006.01)
*B65G 53/52* (2006.01)

(52) U.S. Cl.
CPC ............. *B65G 53/08* (2013.01); *B65G 53/36* (2013.01); *B65G 53/526* (2013.01); *B65G 2201/0202* (2013.01)

(58) Field of Classification Search
None
See application file for complete search history.

(56) References Cited

U.S. PATENT DOCUMENTS

| | | | | |
|---|---|---|---|---|
| 3,893,420 | A * | 7/1975 | Andreev | A01K 67/30 119/6.6 |
| 4,014,577 | A * | 3/1977 | Clancy | B65G 53/66 137/118.02 |
| 4,411,220 | A | 10/1983 | Voegele et al. | |
| 10,647,527 | B2 | 5/2020 | Stark et al. | |
| 2015/0246773 | A1* | 9/2015 | Sundholm | B65G 11/123 193/29 |
| 2018/0049417 | A1 | 2/2018 | Leo | |

FOREIGN PATENT DOCUMENTS

| | | | |
|---|---|---|---|
| DE | 2253886 | A1 | 5/1974 |
| DE | 102016007061 | A1 | 12/2017 |
| WO | 2020246873 | A1 | 12/2020 |

OTHER PUBLICATIONS

International Search Report, PCT Application No. PCT/EP2022/054578, mailed Jun. 17, 2022 (5 pages).

* cited by examiner

*Primary Examiner* — William R Harp
(74) *Attorney, Agent, or Firm* — Young Basile Hanlon & MacFarlane, P.C.

(57) ABSTRACT

A method and a device for transporting a plurality of insects from a chamber to a location via a channel, wherein the insects are transported by means of an apparatus for producing a medium flow, and wherein a transport additive is added to the medium flow during transport, the amount of the transport additive being set in accordance with the amount of insects moved.

4 Claims, 2 Drawing Sheets

PNEUMATIC TRANSPORT OF INSECTS

CROSS REFERENCE TO RELATED APPLICATIONS

This applications is a national phase under 35 USC 371 of International Application No. PCT/EP2022/054578, filed Feb. 23, 2022, which claims the benefit of the filing date of European Application No. 21159057.5, filed Feb. 24, 2021, the contents of all of which are hereby incorporated by reference in their entireties.

TECHNICAL FIELD

The invention relates to a device and a method for conveying or transporting a plurality of insects via a channel, and to the use of a medium flow for this purpose, in particular for a system for automated rearing and handling of the insects. The invention further relates to an insect developing station and an automated insect rearing and handling system having at least one device for conveying or transporting a plurality of insects via a channel. In addition, the invention relates to the use of a carrier additive for the gentle transport of insects or very small animals in a medium flow.

BACKGROUND

In the field of insect rearing, it is usually necessary to move insects from one location to another in order to provide different environments or living conditions selected for the insect's particular stage of development. The transport of insects known in the prior art is complex. Up to now, in insect rearing, the insect larvae in particular have mostly even been carried by the user in a container from one location to another, or containers containing the insects have been moved using mechanical transport apparatuses. Known more complex transport apparatuses for piece goods or feed are not used for the transport of live animals and, above all, do not promise sufficiently gentle transport of the insects. For example, the air velocities required for air-blown feed transport typically generate significant shear forces.

SUMMARY

The object of the invention is to provide a method, a device and a use with which the disadvantages associated with the prior art in the transport of insects can be at least partially overcome.

The object is solved with the subject matter of the independent claims. Advantageous embodiments result from the respective dependent claims and the description.

According to a core idea of the invention, animals are moved from a chamber to a location outside the chamber by means of a medium flow via a channel. A force can be exerted on the insects with the medium flow in order to achieve this. Surprisingly, the invention allows a sufficiently gentle transport for animals, which puts little stress on the animals and can nevertheless be automated. The transport is advantageously possible with or without feed and in particular also together with the excreta of the animals.

By means of medium flow, which can be designed in particular as an air flow, insects that are not capable of flying can also be transported easily and gently and with low stress. The insects can also be moved without having to be placed in a transport container. The term "medium flow" also includes a combination of several components, such that in addition to the air flow, other gaseous, liquid, solid and/or fluid components may be present.

The term "transporting" as used in the description comprises any kind of movement from one location to another.

For the purposes of the description, "insects" may be any insect or their fertilized or unfertilized eggs, or insects in any stage of life, particularly in which they are not capable of independent flight. The insect may be live insects of the genus "*Hermetia illucens*" with potentially rapid and high weight gain. However, as described further below, in all embodiments, the invention is not limited to insects, but is suitable for any type of conveyance of living creatures.

For the purposes of the description, a "chamber" may be any volume delimited on one or more sides that may contain the insects. The chamber is suitable to be connected to the channel, preferably detachably. For the purpose of transporting the insects, the channel is connected to the chamber while the transport is being carried out. The chamber may be provided with a sluice and/or hopper to feed or introduce the multiple insects into the chamber.

For the purposes of the description, the term "channel" comprises an elongated body with a volume that is designed to guide the medium flow or to impose a directed movement on the medium flow. In particular, the channel can be a pipe or a pipe portion of any cross-section, which in particular can be designed to be flexible. It is possible that the channel has a different design in portions. The channel can also be designed at least partially or completely as a shaft or shaft system. The channel can be part of a (channel) system in which, for example, there can be several portions that are connected to one another by means of fixed or flexible connecting elements.

For the purposes of the description, the "location" may be the transport destination for the insects, which may be selected to provide living conditions adapted to the life stage or developmental stage of the insect or handling conditions intended for processing. In particular, the location may represent a temporary holding station for the insects.

The term "medium flow" can be understood as a flow containing a gaseous, liquid or finely dispersed solid substance. In particular, the medium may be a gas, in particular air, a liquid, or a fluid that has both gaseous and liquid or solid components. Combinations of the mentioned aggregate states of substances are freely selectable.

A carrier additive may be added to the medium flow to protect animals from injury during transport. The carrier additive can be part of the chamber, which can be freely movable with respect to the chamber in which it is initially present, or the carrier additive can be added separately to the medium flow.

The term "carrier additive" can be understood to mean synthetic or natural, preferably elastic, materials which can be added to the medium flow, which are suitable for improving transport and, for example, for protecting the living creatures and/or objects to be conveyed, such as insects, against injury or damage during transport. Preferably, these substances have a particular softness and low bulk weight. The carrier additive can be a loose structure of soft fibers, such as absorbent cotton, or a bulk material such as wheat bran. The carrier additive may at least partially surround the objects, in particular the insects, and/or the objects, in particular the insects, may be adjacent to the carrier additive or embedded in the carrier additive or blown with the carrier additive. The carrier additive can have a low density combined with high toughness such that in the event of possible deformation in the medium flow, for example, caused by bends or curves in the channel, primarily the carrier additive can be deformed without the animals surrounded by the carrier additive being damaged. The carrier additive may have a function involving shock adsorption, in that the carrier additive absorbs shocks and/or forces and keeps them away from the animals or buffers them. Chambers, such as air chambers, may be present in the carrier additive that can be deformed and/or compressed when a shear, compressive, and/or other force is applied to adsorb and/or deflect the forces away from the animals. The chambers can be designed to reset, at least to some extent, when the force is no longer acting on the carrier additive or is acting in a different direction.

It may be provided that the carrier additive is present in lump form, wherein the carrier additive can in particular be solid and, due to its dimension of the individual lumpy solid components, forms chambers in which the living creatures and/or objects to be transported are or will be arranged. A non-compressible lumpy configuration may allow for adjustment of the overall shape of the carrier additive in bends and/or kinks of the channel, but may also allow for spaces between the lumpy solid components to be substantially preserved.

In a preferred embodiment, a feed or food may be disposed on or in the carrier additive. It may also be provided that the carrier additive is designed substantially as a feed. The feed may be provided as an attractant to the animals so that a plurality of the animals will occupy the position(s) of the feed. For example, the feed may be surrounded by the carrier additive; it may also be provided that a plurality of separate volumes of the feed are each surrounded by the carrier additive, wherein the carrier additive may be handled as a single unit by a user. The carrier additive may be designed to be contiguous, which can simplify handling. In case of a loose structure of yarns or fibers, the carrier additive can be easily "portioned", which allows simple handling.

The amount or volume of the carrier additive can be adapted to the amount or number of animals to be transported, thus enabling resource-saving transport. Multiple use of a carrier additive—which may have been purified—can lead to improved transport, with special consideration being given to sustainability. It may also be provided that the carrier additive can be reprocessed after a use, for example by re-loosening the structure of the carrier additive and/or re-establishing or activating chambers of the carrier additive that serve shock adsorption.

Insofar as it is described that the insects are actively moved from the chamber to the location by means of the action of a medium flow, this is to be understood as meaning that the medium flow is substantially the cause for the transport of the insects. It is not excluded, for example, that there is an additional component, in particular along a route section in the channel, which is caused, for example, due to gravity or the action of the acceleration due to gravity or other active measures or the insect's own activity. For an "active movement" it is sufficient that the insects are moved over at least a portion between the chamber and the location substantially by the action of the medium flow.

In a preferred embodiment, insects are moved to multiple cambers or locations. The chamber can optionally be connected to the location or other chamber by means of a channel and the medium flow can be generated to actively move the insects to it, at least in part. This creates the possibility of supplying the insects selectively and specifically to different locations or chambers, with the location or chamber being able to be changed or remain stationary. It is thus possible to move the insects to different locations of handling. By means of an appropriate design of the channel or the channel system, which can in particular have switches, for example in the form of flaps or the like, the optional feed can be effected. It may also be provided that the channel can be moved at least in portions in at least one spatial direction, in particular in two spatial directions, most preferably in three spatial directions, to either move the insects from the chamber to different locations or chambers.

In a preferred embodiment, feed may be added to the medium flow before or with the insects during transport, the amount of which is preferably measured as a function of the amount of insects being moved. For example, insect larvae may be initially introduced into the chamber in a metered manner, with feed, in particular in the form of wheat bran, being introduced into the chamber and the insects being moved with the feed to the chamber or further location or chamber.

The invention also provides a device for transporting insects, in particular insect larvae, from a chamber to a location, wherein a channel connecting the chamber to the location and an apparatus for producing a medium flow are provided. The medium flow can be used to actively move the insects, at least in part, from the chamber to the location.

The channel can be designed to selectively connect the chamber to different locations or chambers. In a preferred embodiment, insects may be conveyed from a chamber to selected locations or chambers in a complementary or alternative manner in a channel system.

This may include one or more insertion openings into the channel system or into a chamber through which the insects and or feed may be introduced. In particular, a hopper arranged at the channel or chamber can be used for this purpose. Through the hopper, the insects or feed, or a mixture of both, can be fed to a sluice and thus to the medium flow.

In a preferred embodiment, the device has a sluice, which can have a moving sluice wheel, in particular rotating about an axis. The sluice wheel can have at least one, preferably three or more, blades arranged in particular at equidistant angles around the axis of rotation, which blades allow a feed of living creatures and/or carrier additive or feed to be transported or moved, the channel being substantially closed in the discharge direction at the insertion opening. The blades of the sluice wheel can have a soft material, in particular a soft plastic, for example a rubber with a low Shore density, or consist substantially of a or the soft material. The soft material may in particular be a plastic. The blades may extend away from the axis of rotation, curved or bent with respect to the extension, wherein a backward bend with respect to the direction of rotation is preferred. A backward (rearward) curvature or bend of the blades may be designed with respect to the direction of rotation. Shear forces can be reduced. Shearing can be mitigated to only a slight squeeze. In a particularly preferred embodiment, it may be provided that a sluice wheel rotating about an axis of rotation is arranged at an insertion opening. Blades extending from the axis of rotation can be arranged on the sluice wheel. A portion can be formed between two adjacent blades into which living creatures and/or objects, possibly with carrier additive and/or feed, can enter, in particular under the influence of gravity, and be moved in the direction of rotation by the rotation of the sluice wheel. If the portion between the two adjacent blades comes into communication with the channel, the living creatures and/or objects may be discharged into the channel, optionally with carrier additive and/or feed, in particular under the influence of gravity. The living creatures and/or objects, optionally with carrier additive and/or feed, can then be moved or transported in the channel under the influence of the medium flow.

In a preferred embodiment, an additional and/or alternative introduction of a medium flow can take place in the area of an arc, a curve and/or a bend, for example by supplying an air flow in the area of the arc, the curve and/or the bend. An additional medium flow can be introduced into the channel, which can be guided in the area of the arc, curve and/or bend through a portion of the channel that is at least partially permeable to the medium flow. For example, the portion of the channel permeable to the medium flow may have one or more passages through which the medium flow may be introduced; by subjecting the passages to the medium flow, it is possible to ensure that no living creature and/or object to be transported, optionally with carrier additive or feed, exits the channel at the passages. A targeted introduction of a medium flow, e.g., a gas, in particular air, can be achieved in order to reduce friction and/or shear force. Provision can be made for a porous material to be lined with a porous material in the arc, curve and/or bend on the wall on which the additional media flow is to be introduced; the wall may have a feed from the additional media flow and can diffuse through the porous material into the channel.

In a preferred embodiment, the channel from the chamber to the location may be designed without flaps so that there is substantially free passage between the chamber and the location and, in particular, there is no closure, even temporarily, between the chamber and the location. A temporarily closable valve that may be formed at the end of the channel in the immediate vicinity of the location can be excluded from this.

In a preferred embodiment, the apparatus for producing a medium flow is designed to produce a medium flow with a velocity in a range of 0.1 m/s to 80 m/s, preferably 4 m/s to 12 m/s. It has been shown that the insects survive the movement unharmed at the aforementioned velocities of the medium flow.

In a particularly preferred embodiment, the apparatus for producing a medium flow is designed as a side-channel compressor or a piston compressor, etc. By means of a compressor station, multiple compression of the medium flow can be achieved, which in particular allows significantly higher differential pressures to be generated. Gentle transport is ensured according to the invention and can be further increased by the described use of a carrier additive, the described introduction into the channel by means of an insertion opening and, optionally, a sluice, as well as the introduction of additional medium flow in the region of an arc, curve and/or bend.

In a particularly preferred embodiment, a nozzle is provided in the end area of the channel at the outlet, i.e., in particular at the location, which provides for a partial deflection of the medium flow across the cross-section at the outlet. A wall of the channel can be bent into the channel in the end area, such that the wall is bent in transversely to the longitudinal direction of the channel in the end area; in particular, a deflection of the medium flow in a partial area of the cross-section by more than 45°, in particular more than 55°, in particular more than 65°, in particular more than 75°, in particular more than 85°, to the previously selected direction in the channel can be provided. A nozzle can be formed at the outlet. In a circumferential area, the nozzle may be a "continuation" of the channel and may comprise in a circumferential area a rounding transverse to the longitudinal extent of the channel in the sense of a reduction in cross-section which may comprise an area of a bend or curve; the angular range of the "continuation" may be in the range of 90° to 200° of the circumference, the angular range of the rounding may be in the range of 90° to 200° of the circumference. The partial deflection can achieve a reduction in the overall velocity in one direction of the channel, in that the channel at the outlet has a partially different orientation or direction with respect to the outlet direction than the channel up to the outlet. The discharge of the objects or living creatures at the area of the outlet can be deflected, for example, by 20° to 90°, in particular 30° to 80°, in particular 40° to 70°, in particular 40° to 60°.

The optionally present components of the channel system, such as nozzles, transitions, changes of direction, switches and end pieces, can be designed in a particularly animal-friendly manner. For example, a specially shaped end piece, such as a rounded end piece, can allow the animals to be introduced into a defined area within a defined location in a targeted manner without placing any particular stress on the animals.

Furthermore, it can be advantageous to temper the intake air, e.g., to 20-50° C., preferably to 40° C., in particular to counteract the cooling effect of the pressure reduction in the channel system. It may additionally or alternatively be provided that the channel is heated at least in sections such that a temperature of 20° C. to 50° C., in particular 30° C. to 45° C., preferably 40° C., is present inside the channel.

An insect development station is also created, which comprises a device described within the scope of the description.

An insect development station may include an area or a complete system for insect rearing where insects are purposefully propagated or produced and bred. For example, insects may be cultivated for the purpose of providing them as feed animals or processed as feed, in particular for domestic or farm animals. In the insect rearing process, live animals are continuously moved or transported between different areas designed for the particular life stage or processing.

The transport is stressful for both the animals and the people involved in the transport. In addition to different general conditions at the point of origin and destination, the transport or movement from the point of origin should be carried out as quickly and gently as possible. The present invention demonstrably makes this possible because the method of transport according to the invention can reduce the growth time of the insects until they reach a target final weight and demonstrably reduce the mortality rate.

The invention also creates an automated insect rearing and handling system with at least one device described, wherein the insects are provided in different stations and the stations are operated in an automated manner with respect to handling and transport.

The invention also proposes the use of a device for generating a medium flow for transporting a plurality of insects, in particular insect larvae, from a chamber to a location via a channel.

The invention also proposes a use of a carrier additive for the gentle transport of insects or very small animals in a medium flow, wherein, in particular, a described device or apparatus may be used.

In an aspect constituting an invention in its own right, a method and a device for transporting at least one living creature with the features described above or any combination thereof is also disclosed.

The living creature may also be a mammal, a small animal or a very small animal.

In an aspect independently constituting an invention, there is further written using a device for producing a medium stream when moving at least one living creature.

Numerical data in the sense of the description are data which may be subject to a tolerance of +/−10%, in particular +/−5%, such that the numerical data describe not only describes the one value, but a range of values, in particular to take into account tolerance ranges that may be production-related.

Insofar as the invention is described with respect to aspects relating to the device, the method and a use, the individual aspects with their mentioned features complement one another with respect to the design of the features for each of the other aspects, such that in particular features of a method or a device also apply to the description of the respective other aspect by means of device features or method features, respectively. If features are described with respect to one aspect, this description is to be understood as also being a description for a feature of the other aspect.

The above statements, like the following description of exemplary embodiments, does not constitute a waiver of any particular embodiments or features.

The invention is explained in more detail below with reference to examples of embodiments shown in the drawings.

DETAILED DESCRIPTION

Figure 1:
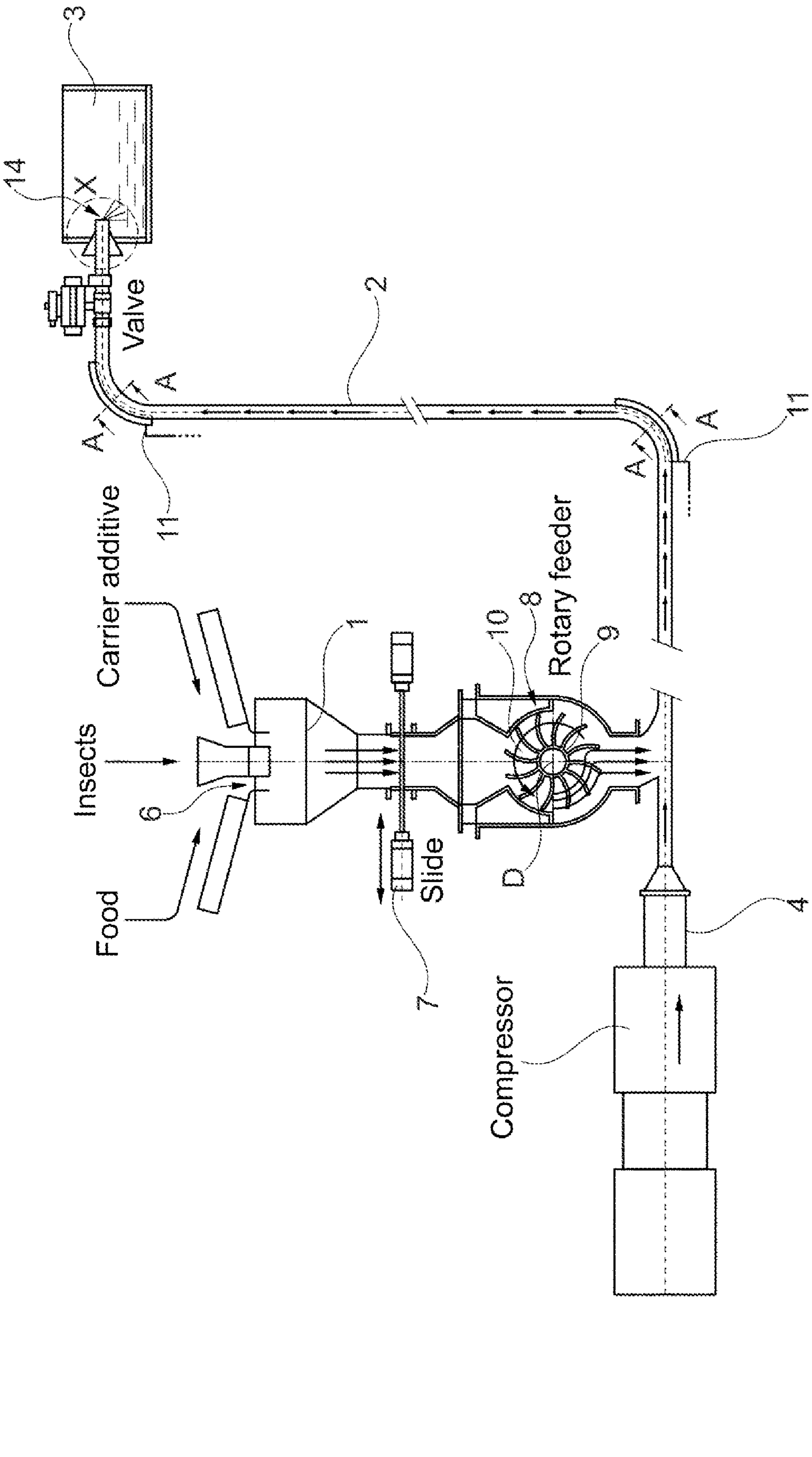
FIG. 1 shows a schematic representation of a device for transporting a plurality of insects, in particular insect larvae.

FIG. 1 shows in a schematic, partially cut representation a device for transporting objects and/or living creatures. In the embodiment shown, insects, in particular insect larvae, are transported using the device for transporting. The device has a chamber 1 into which insects can be filled or the insects are present in the chamber 1. Furthermore, the device has a channel 2. The channel 2 connects the chamber 1 with a location 3 to which the insects are transported. Furthermore, an apparatus 4 for producing a medium flow is provided. By means of the medium flow, the insects or insect larvae can be at least partially actively transported from the chamber 1 to the location 2.

The chamber 1 has an insertion opening 6 through which the insects can be fed. The chamber 1 can be separated from a sluice 8 designed as a rotary feeder by means of a slider 7. By means of the sluice 8, the insects or insect larvae can be fed to the channel 2.

The sluice 8 is designed as a rotary feeder and has a sluice wheel 9 rotating about an axis of rotation that extends perpendicular to the paper axis and intersects the center D of the sluice wheel 9. The sluice wheel has blades 10 curved in the plane transverse to the axis of rotation.

Figure 3:
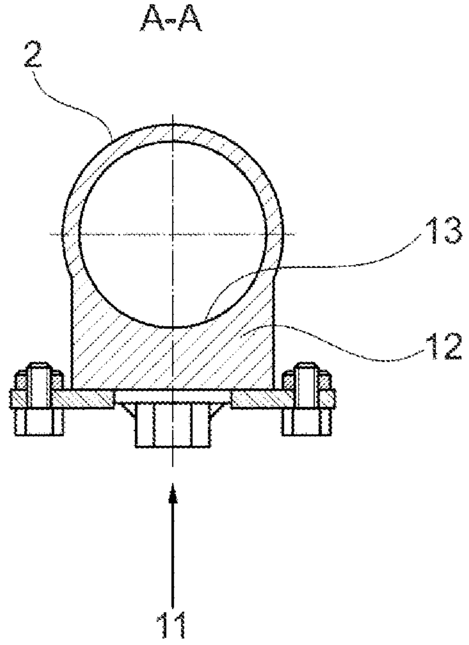
FIG. 3 shows an enlarged schematic representation of a nozzle in the end area of the channel of FIG. 1 in the area marked X.

In the embodiment shown in FIG. 1, an additional or alternative introduction of a medium flow is provided at a bend, curve or bend K of the channel 2 (FIG. 3). For this purpose, the wall of the channel 2 in this area has a feed 11 for feeding the additional medium flow, which is arranged on the outside of the curve, bend or arc. Inside the channel 2, in the curve K, the inner wall of the channel 2 adjacent to the outside of the curve is lined with porous material 12. The porous material 12 allows the additional medium flow introduced into the channel 2 by the feed 11 to diffuse into the free portion of the channel 2. A medium flow pad 13 can form between the porous material 12 and the free portion of the channel 2.

Figure 2:
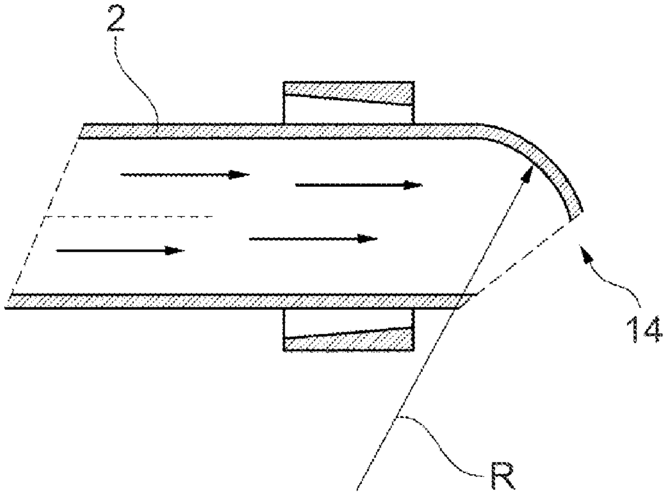
FIG. 2 shows an enlarged schematic representation of a portion of a channel in the area of a bend, in cross-section, labeled A-A in FIG. 1.

FIG. 2 shows a sectional view of the area X of FIG. 1. In the area of the location 3, an outlet opening 14 is provided, where the wall of the channel 2 is bent in over an angular range of the circumference in the end area. For this purpose, FIG. 2 shows a curved "upper" area in which a radius is indicated schematically transverse to the longitudinal extent of the channel 2. The "lower" area at the outlet opening 14 extends straight across the longitudinal extent of the channel 2.

The invention claimed is:

1. A method for transporting a plurality of insects from a chamber to a location through a channel, the method comprising:

generating a media flow that acts on the plurality of insects to move the plurality of insects at least partially actively from the chamber to the location and/or to additional chambers; and adding a carrier additive to the media flow, the carrier additive being suitable for protecting the plurality of insects during transport and an amount of the carrier additive being metered as a function of an amount of the transported insects.

2. The method of claim 1, further comprising adding a feed material to the media flow, an amount of the feed material being metered as a function of an amount of the transported insects.

3. The method of claim 1, further comprising providing a device configured to generate the media flow that moves the plurality of insects at least partially actively from the chamber to the location.

4. A method of using a carrier additive for gentle transport of insects or small animals in a media flow, the method comprising:

providing a device for transporting a plurality of insects, the device connecting a chamber containing the insects to a location by way of a channel and including a device for generating a media flow; and generating, with the device for generating the media flow, a media flow suitable for transporting the plurality of insects at least partially actively from the chamber to the location;

wherein the gentle transport of the insects or small animals in the media flow is carried out by adding a carrier additive to the media flow.

* * * * *